United States Patent
Mondal et al.

(10) Patent No.: US 11,275,748 B2
(45) Date of Patent: Mar. 15, 2022

(54) INFLUENCE SCORE OF A SOCIAL MEDIA DOMAIN

(71) Applicant: ENT. SERVICES DEVELOPMENT CORPORATION LP, Houston, TX (US)

(72) Inventors: Arindam Mondal, Bangalore (IN); Bibhash Chakrabarty, Bangalore (IN); Silvia H. David, Bangalore (IN)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 1026 days.

(21) Appl. No.: 14/895,024

(22) PCT Filed: Jun. 3, 2013

(86) PCT No.: PCT/IN2013/000353
§ 371 (c)(1),
(2) Date: Dec. 1, 2015

(87) PCT Pub. No.: WO2014/195958
PCT Pub. Date: Dec. 11, 2014

(65) Prior Publication Data
US 2016/0117328 A1    Apr. 28, 2016

(51) Int. Cl.
*G06F 16/2457* (2019.01)
*G06F 16/28* (2019.01)
(Continued)

(52) U.S. Cl.
CPC ...... *G06F 16/24578* (2019.01); *G06F 16/285* (2019.01); *G06F 16/95* (2019.01); *G06F 16/9535* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 7,747,630 B2 | 6/2010 | Scofield | |
| 7,831,596 B2 | 11/2010 | Rail et al. | |

(Continued)

FOREIGN PATENT DOCUMENTS

| | | |
|---|---|---|
| CN | 1996299 | 7/2007 |
| CN | 101814171 | 8/2010 |

(Continued)

OTHER PUBLICATIONS

Dr. Nathalie Beauchamp, "The Five Social Media Metrics You Should Be Measuring," Jul. 20, 2012, pp. 1-8, Available at: <http://thehealthypreneur.com/2012/07/20/the-five-social-media-metrics-you-should-be-measuring/>.

(Continued)

*Primary Examiner* — James Trujillo
*Assistant Examiner* — Kurt A Mueller
(74) *Attorney, Agent, or Firm* — Polsinelli PC

(57) ABSTRACT

An example method for determining an influence score of a social media blog domain in accordance with aspects of the present disclosure includes receiving data regarding a social media blog domain based on relevancy to a plurality of keywords, extracting values from the data for a set of categories of metrics for the social media blog domain, assigning a weight to each metric, and calculating an influence score for the social media blog domain based on the weight of the extracted values for each social media profile. The set of categories comprises social engagement, activity, social media page influence and social media blog domain influence.

20 Claims, 3 Drawing Sheets

(51) Int. Cl.
*G06F 16/9535* (2019.01)
*G06F 16/95* (2019.01)
*G06Q 50/00* (2012.01)

(56) References Cited

U.S. PATENT DOCUMENTS

| | | | |
|---|---|---|---|
| 8,375,024 | B2 | 2/2013 | Goeldi |
| 8,655,938 | B1* | 2/2014 | Smith ................ G06F 17/3053 |
| | | | 706/45 |
| 8,977,617 | B1* | 3/2015 | Wu ............................ G06F 7/00 |
| | | | 707/736 |
| 9,870,424 | B2* | 1/2018 | Neystadt ........... G06F 17/30867 |
| 2008/0189169 | A1* | 8/2008 | Turpin .................. G06Q 30/02 |
| | | | 705/7.33 |
| 2009/0048904 | A1 | 2/2009 | Newton et al. |
| 2009/0319518 | A1 | 12/2009 | Koudas et al. |
| 2010/0119053 | A1 | 5/2010 | Goeldi |
| 2011/0022602 | A1 | 1/2011 | Luo et al. |
| 2011/0282880 | A1 | 11/2011 | Krichman et al. |
| 2011/0307397 | A1 | 12/2011 | Benmbarek |
| 2012/0066359 | A1* | 3/2012 | Freeman ........... G06F 17/30864 |
| | | | 709/223 |
| 2012/0185544 | A1* | 7/2012 | Chang .................... G06Q 50/01 |
| | | | 709/206 |
| 2012/0215903 | A1* | 8/2012 | Fleischman ........ G06Q 30/0201 |
| | | | 709/224 |
| 2012/0324004 | A1 | 12/2012 | Le et al. |
| 2013/0018838 | A1* | 1/2013 | Parnaby ................ G06Q 10/10 |
| | | | 706/52 |
| 2013/0018893 | A1 | 1/2013 | Nelson et al. |
| 2013/0103667 | A1* | 4/2013 | Minh ................ G06F 17/30864 |
| | | | 707/709 |
| 2013/0173368 | A1* | 7/2013 | Boutin .............. G06F 17/30283 |
| | | | 705/14.16 |
| 2014/0019539 | A1* | 1/2014 | Novak ............... G06Q 30/0201 |
| | | | 709/204 |
| 2014/0025478 | A1* | 1/2014 | Mischuk ........... G06Q 30/0242 |
| | | | 705/14.41 |
| 2014/0195606 | A1* | 7/2014 | Krishnamurthy ..... H04L 67/306 |
| | | | 709/204 |

FOREIGN PATENT DOCUMENTS

| | | |
|---|---|---|
| CN | 102722534 | 10/2012 |
| JP | 2012203499 | 10/2012 |
| KR | 20120019267 | 3/2012 |
| WO | WO-2008094660 | 8/2008 |
| WO | WO-2012099970 | 7/2012 |
| WO | WO-2012108883 | 8/2012 |

OTHER PUBLICATIONS

International Search Report and Written Opinion, International Application No. PCT/IN2013/000353, dated Mar. 6, 2014, pp. 1-7.
International Search Report and Written Opinion, International Application No. PCT/US2013/043520, dated Feb. 25, 2014, pp. 1-8.
Peter Wortmann, "Topic-Based Blog Article Search for Trend Detection," Mar. 19, 2009, pp. 1-36, Available at: <dfki.uni-kl.de/~obradovic/download/pa-wortmann.pdf>.

* cited by examiner

INFLUENCE SCORE OF A SOCIAL MEDIA DOMAIN

BACKGROUND

Social media platforms are sources of valuable information that may be used to generate insights about products or services, competition, and industries. Social media platform may be on many different forms including online magazines, Internet forums, weblogs, microblogging sites, wikis, social networks, podcasts, photographs or pictures sharing sites, video, rating and social bookmarking sites.

A blog may be a website in which items (e.g., an online journal or diary) may be posted and may be displayed in, for example, reverse chronological order. Individual articles on a blog may be referred to as "blog posts," "posts" and/or "entries." Blogs may often provide useful information about a search result, such as honest reviews, contrasting opinions, links to related material, etc. For example, Blogger® is a social media platform that allows users to create blog posts under assigned blog domains. Many other similar platforms exist as well, such as Tumblr®.

Social media platforms including blogs can be valuable to a business because the users may utilize these platforms to share a comprehensive review of new products, features, brand and organization. Accordingly, marketing activities like brand promotion, product promotion, brand advocacy, brand awareness, product features awareness, product launch buzz creation may be carried out by the marketing groups of respective companies for the customers through blogs.

BRIEF DESCRIPTION OF THE DRAWINGS

Example implementations are described in the following detailed description and in reference to the drawings, in which.

DETAILED DESCRIPTION

Figure 1:
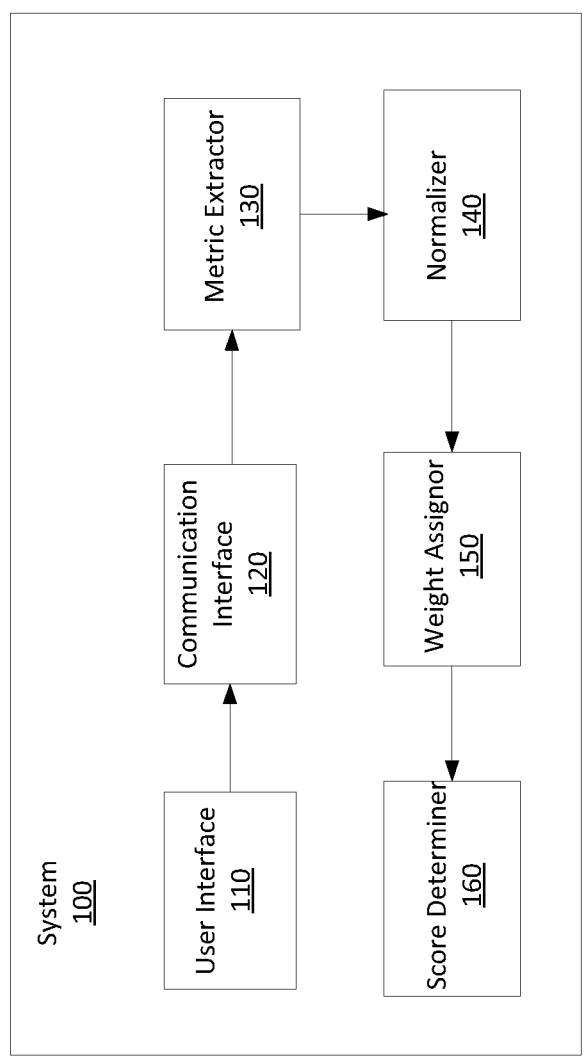
FIG. 1 illustrates an example system to determine an influence score of a social media blog domain in accordance with an implementation.

Various implementations described herein are directed to a ranking of a social media blog domain influence in a given topic area. More specifically, and as described in greater detail below, various aspects of the present disclosure are directed to a manner by which a linear combination of metrics score each social media blog domain.

Aspects of the present disclosure described herein calculate an influence score of a social media blog domain based on various metrics. Moreover, the aspects of the present disclosure described herein assign different weights to the metrics based on business rationale. Accordingly, the approach described herein allows identifying a social media blog domain which has a strong influence over the social media platform's audience. Among other things, this approach may allow interpreting and measuring seamlessly top influencing social media blog domain relating to a given topic or business context, which results in businesses gaining insight into the effectiveness of their own social media marketing campaigns (e.g., the business may have one or more social media blog domains sending messages to attempt to influence consumer behavior), and identifying third party social media players that the business may be able to work with or emulate. In addition, by basing the influence score on various metrics taking into account not just the content of the messages but the reach of the messages based on the blog domains network and the like, a more accurate determination of influence may be made. As a result, businesses may improve their advertising and marketing efforts and more effectively influence the behavior of customers and potential customers.

In one example in accordance with the present disclosure, a method for determining an influence score of a social media blog domain is provided. The method comprises receiving data regarding a social media blog domain based on relevancy to a plurality of keywords, extracting values from the data for a set of categories of metrics for the social media blog domain, assigning a weight to each metric, and calculating an influence score for the social media blog domain based on the weight of the extracted values for each social media profile. The set of categories comprises social engagement, activity, social media page influence and social media blog domain influence.

In a further example in accordance with the present disclosure, a system is provided. The system comprises an interface to initiate a search of blog domains based on a keyword and a time period, a communication interface to receive a list of blog domains and associated data relevant to the keyword and the time period, a metric extractor to identify values of social engagement metrics, page influence metrics, domain influence metrics and activity metrics in the list of blog domains, a normalizer to normalize the values of all the metrics, and a score determiner to determine an influence score for each blog domain based on calculating a weighted sum of the normalized values associated with each blog domain.

In another example in accordance with the present disclosure, a non-transitory computer-readable medium is provided. The non-transitory computer-readable medium comprises instructions that when executed cause a device to (i) receive data regarding a social media blog domain based on relevancy to a plurality of keywords, (ii) extract values from the data for a set of categories of metrics for the social media blog domain, the set of categories comprising social engagement, activity, social media page influence and social media blog domain influence, (iii) assign a weight to each metric, and (iv) calculate an influence score for the social media blog domain based on the weight of the extracted values for each social media profile.

FIG. 1 illustrates an example system 100 in accordance with an implementation. The system 100 comprises a computer system to determine an influence score for a social media blog domain, according to one example. The system 100 may comprise a user interface 110, a communication interface 120, a metric extractor 130, a normalizer 140, a weight assignor 150, and a score determiner 160, each of which is described in greater detail below. The system 100 can be any of various computers or computing devices. For example, the system 100 can be a desktop computer, workstation computer, server computer, laptop computer, tablet computer, smart phone, or the like. It should be readily apparent that the system 100 depicted in FIG. 1 represents a generalized illustration and that other components may be added or existing components may be removed, modified, or rearranged without departing from a scope of the present disclosure. For example, while the system 100 illustrated in FIG. 1 includes only one computer, the system may actually comprise a plurality of computers, and only one has been shown and described for simplicity.

It should be noted that the system 100 is intended to be representative of a broad category of data processors. The system 100 may include a processor and memory and help translate input received by, for example, a keyboard. In one implementation, the system 100 may include any type of processor, memory or display. Additionally, the elements of the system 100 may communicate via a bus, network or other wired or wireless interconnection.

In some implementations, a user may interact with the system 100 by controlling a keyboard, which may be an input device for the system 100. The user may perform various gestures (e.g., touching, pressing) on the keyboard.

The system 100 can be used to search social media blog domain (e.g., blog domain consisting of discrete entries by at least one author or content provider) based on one or more keywords. The social media blog domains may be domains of blogs associated with a social media platform (e.g., Blogger®). A keyword can be received via the user interface 110. In one implementation, the user interface 110 may be a display of the system 100. The user interface 110 can include hardware components and software components. For example, the user interface 110 may include an input component, such as a keyboard, mouse, or touch-sensitive surface, etc., and an output component, such as a display, speakers, etc. The user interface 110 may refer to the graphical, textual and auditory information a computer program may present to the user, and the control sequences (such as keystrokes with the computer keyboard) the user may employ to control the program. In one example system, the user interface 110 may present various pages that represent applications available to the user. The user interface 110 may facilitate interactions between the user and computer systems by inviting and responding to user input and translating tasks and results to a language or image that the user can understand. In another embodiment, the system 100 may receive input from a plurality of input devices, such as a keyboard, mouse, touch device or verbal command.

Figure 3:
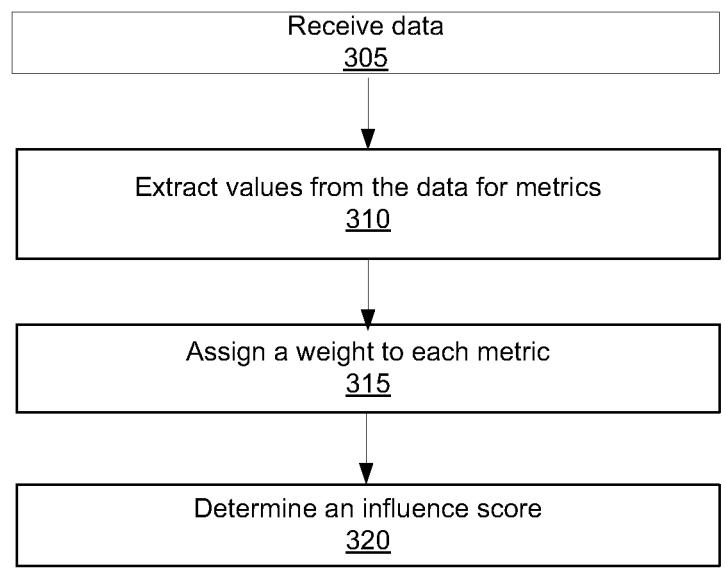
FIG. 3 illustrates an example process flow diagram in accordance with an implementation.

The user interface 110 may be resident on the device or system executing the methods disclosed herein or it can be on a remote computer, such as on a client device connecting to a server. The user interface 110 may initiate a search of social media blog domains, such as blog domains, based on a keyword and/or a time period. The user may provide a set of keywords through the user interface 110. The keywords can relate to a topic, business context, or the like, as described above. The keyword can be provided to a monitoring engine. The monitoring engine can be resident on the device or system executing methods described herein or it can be hosted on another computer. In one example, the monitoring engine may be a third party system, such as Radian6. The engine may execute a search of the specified platforms and obtain data regarding social media blog domains (e.g., a blog domain) that are relevant to the keyword. Accordingly, this data can be received. This data can then be used in a process, such as depicted in FIG. 3, to determine an influence score of the identified social media blog domain. Additional data regarding the domains that is not provided by the social media monitoring engine may be obtained from the social media platform itself. For example, an application programming interface (API) for the social media platform may be used to request the data. In one implementation, data is collected using the API Incite for a defined set of keywords for a specific time period. The data may be collected by using the URLs of the blog posts as input to the API's.

The communication interface 120 can be used to transmit and receive data to and from other computers. For example, the communication interface 120 may receive a list of social media blog domains and associated data relevant to the keyword and/or time period. The communication interface 120 may include an Ethernet connection or other direct connection to a network, such as an intranet or the Internet. The communication interface 120 may also include, for example, a transmitter that may convert electronic signals to radio frequency (RF) signals and/or a receiver that may convert RF signals to electronic signals. Alternatively, the communication interface 120 may include a transceiver to perform functions of both the transmitter and receiver. The communication interface 120 may further include or connect to an antenna assembly to transmit and receive the RF signals over the air. The communication interface 120 may communicate with a network, such as a wireless network, a cellular network, a local area network, a wide area network, a telephone network, an intranet, the Internet, or a combination thereof.

The system 100 may include the metric extractor 130, the normalizer 140, the weight assignor 150, and the score determiner 160. These components may be implemented using a combination of hardware, software, firmware, or the like, including a machine readable medium storing machine-executable instructions and a processor or controller. The metric extractor 130 may identify values of various metrics for each social media blog domain. The metrics are described in greater detail below.

In one implementation, values may be extracted from the data for each social media blog domain. For example, values may be extracted from the data for a blogger domain. The values may vary based on the source the data is collected from. Further, the values may relate to a plurality of categories of metrics.

More specifically, the values extracted from the data for a social media platform like blog domain may relate to a first, second, third and fourth category of metrics. The first category of metrics may relate to social engagement. The second category of metrics may relate to blog page influence. The third category of metrics may relate to blog domain influence, and the fourth category may relate to activities of each blog domain.

Example metrics for each category are described below with reference to a blog domain. The term blogger refers to an individual contributing content in digital form to web logs, more specifically the user associated with the blog domain (or owner of the blog domain). The term Blogosphere references the collection of web logs. The bloggers produce diverse types of information. General topics include personal diaries, experiences (such as those collected through traveling or concerts), opinions (for example, those invoked by products, events, people, music groups, businesses, etc.), information technology, and politics, to name but a few of the vast topics canvassed by blogs.

The first category of metrics applied to a blog domain may relate to social engagement associated with a blog domain. In one example, this category can be divided up into a plurality of basic measures. The metrics may comprise Facebook shares, Facebook comments, Facebook likes, LinkedIn shares, Twitter shares, Reddit Score. Example metrics are described below with respect to each measure.

Facebook shares may be the count of times the blog-post URL is mentioned on Facebook. Facebook comments may be the count of comments the blog post have received on Facebook. Facebook likes may be the count of likes that the blog-post has received on Facebook. Linkedin shares may be the count of time the blog post has been shared on LinkedIn. Twitter shares may be the count of times the blog post has been shared on twitter. Reddit score may be the count of times the blog-post has received an up or minus the number of times the blog post has received a down on Reddit.

The second category of metrics may include page influence associated with the blog domain. This category may measure how popular the blog post page in terms of its importance in the web, and, how others are influenced by the page. In one implementation, this category may comprise the following metrics: (i) external links, which may be the count of pages from other websites that link to the concerned blog-post page; (ii) Page Authority, which may be measured as the predictive rank of the page in terms of its importance as compared to all the pages in the entire web; (iii) Page Mozrank, which is a measure of how many pages possess good quality in the web link to the concerned blog post page.

The next group of metrics involves domain influence, which includes metrics to determine the influence on a domain level. Example metrics may comprise (i) unique visitors representing the count of unique visitors to the blog domain, (ii) total visits representing the count of total blog domain visits, (iii) average stay, which is the average time spent by visitors in the blog domain, (iv) sub domain mozrank, which measures the static importance of any webpage independent of any search query or links at the sub-domain level, (v) domain authority, which is measured as the predictive rank of the domain in terms of its importance as compared to other domains in the entire web.

Another category may involve a group of metrics involving measuring the activity done on a blog domain. Example metrics may include: (i) consistency, which may be the count of the number of weeks in a given time frame the blog domain had a post; (ii) volume, which may be the count of post in a blog domain; (iii) recency, which may be the count of the number of days since the last blog post happened.

Any combination of metrics as described above, or others not illustrated, may be used to measure social influence of a given blog domain. The values for each metric may be extracted from the data according to various techniques. For example, the data may be in the form of a spreadsheet, exported from a social media monitoring engine (e.g., Radian6). Values for each metric may thus be determined by referring to the appropriate field(s) in the spreadsheet. For instance, a macro may be programmed in Microsoft Excel to generate metric values for each blog domain based on the spreadsheet data. As mentioned previously, the macro could leverage a tool such as NodeXL to generate the network graph and extract the network metric values. The values for some metrics may also be extracted using the API of the social media platform.

In one implementation, the metrics may be mined for the blog from some search engine data API's and traffic data collection API's and some Excel macros may be used to combine them at a domain level.

The normalizer 140 may normalize the values of the metrics. The normalizer 140 may normalize the values according to various techniques. In one implementation, a method where a MaxCutoff value and minimum value can be determined for each metric (over all of the social media blog domains) may be used. The MaxCutoff value can be a value in a certain high percentile of all of the values for a given metric. For instance, the MaxCutoff value can be the maximum value (the 100th percentile), a value in the 98th percentile, or the like. It can be helpful to use a percentile lower than the 100th percentile to exclude outlying values.

The intermediate normalized value of a given extracted value may be determined by subtracting the minimum value from the value, and dividing the result by the result of subtracting the minimum value from the MaxCutoff value. The normalized value can be determined by multiplying the intermediate normalized value by 10. In some examples, the normalized values can be subject to a maximum value of ten, such that anything higher is changed to ten. Thus, the score can range between zero and ten, for example.

The weight assignor 150 may assign a weight to each metric. The weight may represent a relative importance of the metric to the overall influence score. The weight may be determined based on research and analysis of the market and the data platform. For instance, the particular business segment, context, or topic being considered may influence the importance of certain metrics. Similarly, the nature of the data platform may influence the importance of certain metrics. The weight may also be determined using a statistical technique, such as Structural Equation Modeling. Additionally, the weight may be determined by a user and set using a user interface. In such a case, assigning the weight to each metric may merely involve applying the predetermined weight to the metric. In one example, the weights may be set using a user interface or using an automated technique, such as via machine readable instructions employing Structural Equation Modeling.

Structural Equation Modeling is a technique that can estimate causal relations using a combination of statistical data and certain assumptions. A metric category may be considered a latent variable if it is not possible to measure it directly, for example, because it is hypothetical or unobserved. A combination of metrics may be used to determine the representative latent variable. The technique may be based on the hypothesis that a representative latent variable may be explained by a linear combination of variables. The weights or coefficients for each variable can be determined based on statistical importance and fulfillment of certain criterions for the model. The model created by this linear equation structure may be used for multi-level allocation of weights for each metric. For example, categorical weights may be determined for a group of metrics. Accuracy of the model can be improved with a large input data set (e.g., multiple domains and associated data) that is free from missing values. In one example, a software tool or procedure may be used to perform the structural equation modeling, such as PROC CALIS in Statistical Analysis System (SAS).

As mentioned above, the weight for each metric may be determined and assigned using various techniques. One method may be that a user can set a weight for a metric using the user interface 110. As discussed earlier in greater detail, the user interface 110 can be a graphical user interface. The user interface 110 can be resident on the same computing device or system that executes methods disclosed herein or it can be resident on a different computing device or system. The user interface 110 can be part of an application, such as a main application that implements methods disclosed herein or a client application that interface with the main application. The user interface 110 can also be implemented via a web browser. The user may be an administrator of the system and may set the weights using the same computer system. Alternatively, in another implementation, the user may be a user implementing the system remotely from another device. The weight set via the user interface 110 can be assigned to the appropriate metric. Assigning the weight to a metric can include storing an association between the weight and the metric. For instance, assigning the weight can be accomplished by modifying a variable in memory.

The score determiner 160 may determine an influence score for each blog domain. The influence score may be determined by calculating a weighted sum of the normalized values associated with each social media blog domain. The weighted sum may be determined using the weights assigned to each metric. The system 100 may store weights in association with the various metrics for calculating the weighted sum.

Figure 2:
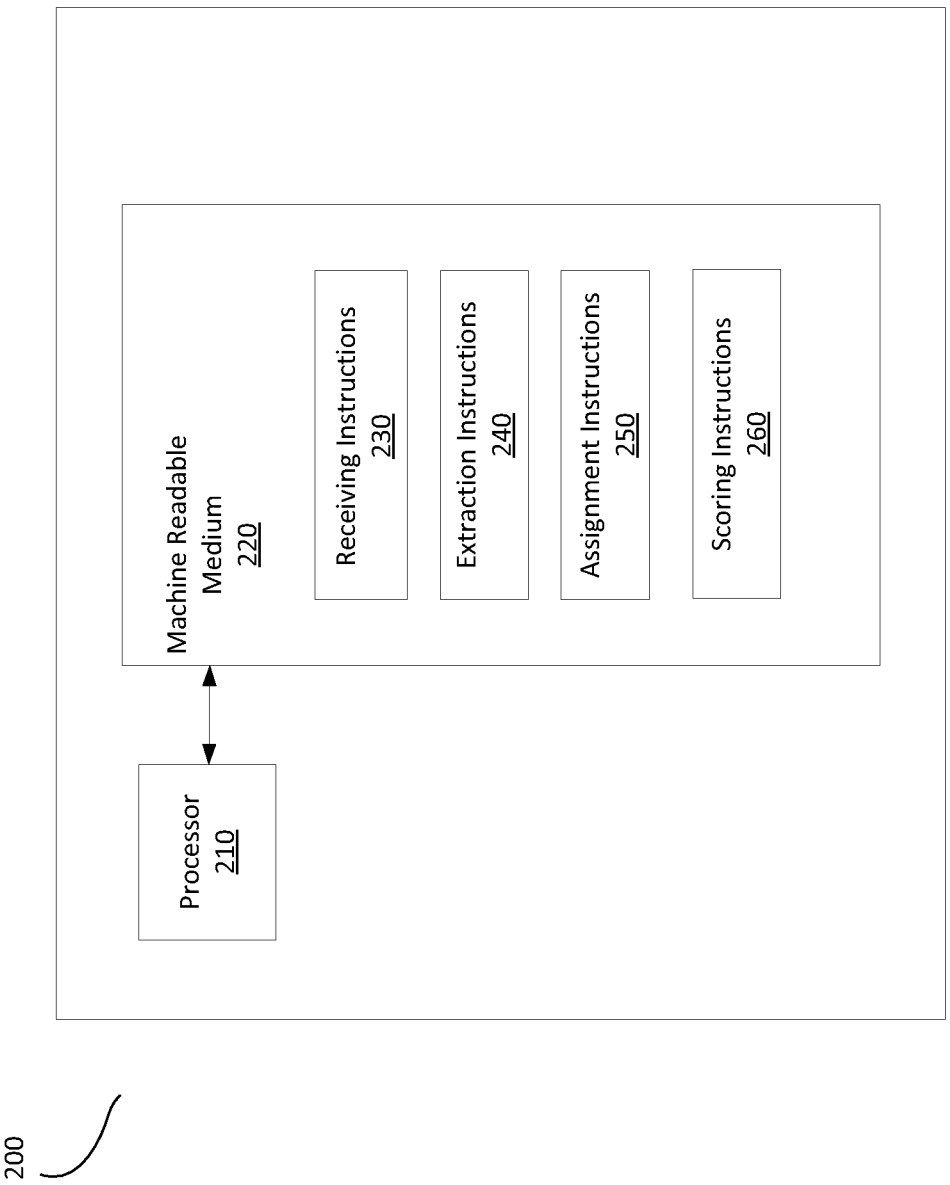
FIG. 2 illustrates an example computer-readable medium to determine an influence score of a social media blog domain in accordance with an implementation.

FIG. 2 illustrates a block diagram illustrating aspects of a computer 200 in accordance with an implementation. It should be readily apparent that the computer 200 illustrated in FIG. 2 represents a generalized depiction and that other components may be added or existing components may be removed, modified, or rearranged without departing from a scope of the present disclosure. The computer 200 comprises a processor 210, a machine readable medium 220 encoded with instructions, each of which is described in greater detail below. The components of the computer may be connected via buses. The computer 200 may be any of a variety of computing devices, such as a workstation computer, a desktop computer, a laptop computer, a tablet or slate computer, a server computer, or a smart phone, among others.

The processor 210 may retrieve and execute instructions stored in the machine readable medium 220. The processor 210 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium, or a combination thereof. The processor 210 may fetch, decode, and execute instructions stored on the machine readable medium 220 to operate the computer 200 in accordance with the above-described examples. The machine readable medium 220 may be a non-transitory computer-readable medium that stores machine readable instructions, codes, data, and/or other information. The instructions, when executed by processor 210 (e.g., via one processing element or multiple processing elements of the processor) can cause processor 210 to perform processes described herein.

In certain implementations, the machine readable medium 220 may be integrated with the processor 210, while in other implementations, the machine readable medium 220 and the processor 210 may be discrete units.

Further, the computer readable medium 220 may participate in providing instructions to the processor 210 for execution. The machine readable medium 220 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

In one implementation, the machine readable medium 220 may have weight and score databases. These databases may store data such as weight values assigned to different metrics and influence scores determined for blog domains.

As discussed in more detail above, the processor 210 may be in data communication with the machine readable medium 220, which may include a combination of temporary and/or permanent storage. The machine readable medium 220 may include program memory that includes all programs and software such as an operating system, user detection software component, and any other application software programs. The machine readable medium 220 may also include data memory that may include system settings, a record of user options and preferences, and any other data required by any element of the computer 200.

In one implementation, the machine readable storage medium (media) may have instructions stored thereon/in which can be used to program the computer 200 to perform any of the processes of the embodiments described herein. Receiving instructions 230 can cause the processor 210 to receive data regarding multiple blog domains based on relevancy to a topic. The topic can include one or more keywords and can relate to a business context. The extraction instructions 240 can cause the processor 210 to extract values from the data for all metrics discussed in greater detail above for each blog domain. Weight assignment instructions 250 can cause the processor 210 to apply a weight to each metric based on a categorical weight associated with each category of metrics and an individual weight associated with each metric within each category (e.g., four categories for social media blog domains). Accordingly, a categorical weight can be applied to each of categories of metrics, each of the categorical weights adding up to hundred percent. An individual weight may also be applied to each individual metric within the categories. Thus, a relative weight can be assigned to each general category indicating an overall value judgment on the importance of that category toward the influence score. The individual weights for each metric within the categories may thus be assigned relative to the other metrics within that category. Additionally, there can multiple categories at different levels. Overall, using categorical weights in addition to individual weights can provide an easier and more intuitive weighting assignment process than assigning a single weight to all of the metrics. Similarly, the previously described weighting process can be applied to computer 200 instead of this one.

Scoring instructions 260 can cause the processor 210 to determine an influence score for each blog domain based on calculating a weighted sum, which can be calculated based on the weights applied by the weighed assignment instructions 250. For example, a weighted sum can be determined for each category of metrics based on the individual weights on the individual metric values. The overall weighted sum can then be determined by calculating a weighted sum of the weighted sums of each category using the categorical weights. The influence score can thus be based on that overall weighted sum. Alternatively, an overall weight for each individual metric can be determined used the respective categorical weight and individual weight, and the weighted sum can be determined using the overall weight for each metric.

Turning now to the operation of the system 100, FIG. 3 illustrates an example process flow diagram 300 in accordance with an implementation. It should be readily apparent that the processes illustrated in FIG. 3 represents generalized illustrations, and that other processes may be added or existing processes may be removed, modified, or rearranged without departing from the scope and spirit of the present disclosure. Further, it should be understood that the processes may represent executable instructions stored on memory that may cause a processor to respond, to perform actions, to change states, and/or to make decisions. Thus, the described processes may be implemented as executable instructions and/or operations provided by a memory associated with the systems 100 and 200. Alternatively or in addition, the processes may represent functions and/or actions performed by functionally equivalent circuits like an analog circuit, a digital signal processor circuit, an application specific integrated circuit (ASIC), or other logic devices associated with the systems 100 and 200. Furthermore, FIG. 3 is not intended to limit the implementation of the described implementations, but rather the figure illustrates functional information one skilled in the art could use to design/fabricate circuits, generate software, or use a combination of hardware and software to perform the illustrated processes.

The process illustrated in FIG. 3 can be implemented to determine an influence score of a blog domain. A blog domain presents discrete blog entries by at least one user, and may enable the sharing of information, messages, photos, videos, or the like.

The process 300 may begin at block 305, where data regarding a social media blog domain may be received. In particular, the data can be the result of a search of social media blog domains and associated data from a social media platform, such as Blogger®. As discussed above with reference to FIG. 1, the data may be collected using API and a social media monitoring solution such as NM Incite for a defined set of keywords for a specific time period. The search can be performed based on one or more keywords or a combination of keywords and Boolean operators. The keywords can define or relate to a particular topic or business context. For example, a user, such as a business, may be interested in determining the influence in the topic area of music, in which case "music" may be a keyword. More specifically, the user may be interested in the influence in the topic area of country music, in which case "country music" may be a keyword. In another example, the user may be interested in the topic area/business context of security aspects of cloud computing, in which case "cloud AND security", or the like may be the keyword combination. Additionally, the search can be performed based on a time period. For example, the search could be limited to on-topic blog entries that were entered during the specified time period.

At block 310, values may be extracted from the data. The values may relate to a plurality of categories of metrics. As discussed in greater detail in reference to FIG. 1, the categories may relate to social engagement, activity, page influence and domain influence. In one implementation, this process may further involve the system normalizing metric values. In particular, this process involves a MaxCutoff value and minimum value to be determined for each metric (over all of the social media blog domains). The MaxCutoff value can be a value in a certain high percentile of all of the values for a given metric. For instance, the MaxCutoff value can be the maximum value (the 100th percentile), a value in the 98th percentile, or the like. It can be helpful to use a percentile lower than the 100th percentile to exclude outlying values. The intermediate normalized value of a given extracted value may be determined by subtracting the minimum value from the value, and dividing the result by the result of subtracting the minimum value from the MaxCutoff value. The normalized value can be determined by multiplying the intermediate normalized value by 10. In some examples, the normalized values can be subject to a maximum value of ten, such that anything higher is changed to ten. Thus, the score can range between zero and ten, for example.

At block 315, a weight is set for each metric. In one implementation, a user may set a weight for a metric using a user interface. The weight set via the user interface can be assigned to the appropriate metric. In particular, assigning the weight to a metric may include storing an association between the weight and the metric. For instance, assigning the weight may be accomplished by modifying a variable in memory.

At block 320, an influence score may be determined for each social media blog domain. The score may be determined by calculating a weighted sum of the metric values. The weighted sum may be determined using the weights assigned at block 315. Accordingly, an influence score directed to the particular topic or business context originally searched may be determined for a social media blog domain.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A computer-implemented method comprising:
receiving, via a processor, data regarding a social media blog domain based on relevancy to a plurality of keywords;
extracting, via the processor, values from the data for a set of categories of metrics associated with the social media blog domain, wherein the set of categories of metrics comprises social engagement, activity, blog page influence, and blog domain influence;
normalizing, via the processor, the extracted values for the set of categories of metrics;
assigning, via the processor, a weight to each category of metric using a statistical technique, wherein the weight indicates an importance of each category of metric and the statistical technique is based on Structural Equation Modeling; and
calculating, via the processor, an influence score for the social media blog domain based on a weighted sum of the normalized extracted values using the weight assigned to each category of metric.

2. The computer-implemented method of claim 1, wherein the social engagement comprises a first metric relating to social media shares, a second metric relating to social media comments, a third metric relating to social media likes, and a fourth metric relating to social media scores, wherein the social media shares are associated with a count of times a uniform resource locator of a social media page has been mentioned, the social media comments are associated with a count of comments a social media page has received, the social media likes are associated with a count of likes a social media page has received, and social media scores are associated with a count of up votes a social media page has received.

3. The computer-implemented method of claim 1, wherein the social media blog domain comprises a plurality of social media pages and each social media page of the plurality of social media pages represents an entity.

4. The computer-implemented method of claim 1, wherein the blog page influence measures a popularity of a social media page and is based on a first metric relating to external links, a second metric relating to page authority, and a third metric relating to page mozrank.

5. The computer-implemented method of claim 4, wherein the external links are associated with a count of websites that links to a social media page.

6. The computer-implemented method of claim 4, wherein the page authority is associated with a rank of a social media page in relation to other social media pages.

7. The computer-implemented method of claim 4, wherein the page mozrank is a measure of quality of links to a social media page.

8. The computer-implemented method of claim 1, wherein the blog domain influence is based on a first metric relating to a number of unique visitors to the social media blog domain, a second metric relating to a number of visits to the social media blog domain, a third metric relating to an average duration of stay by visitors, a fourth metric relating to a sub-domain mozrank, and a fifth metric relating to a social media blog domain authority.

9. The computer-implemented method of claim 8, wherein the sub-domain mozrank measures a static importance of a social media page independent of search queries or links.

10. The computer-implemented method of claim 8, wherein the social media blog domain authority is based on a rank of a social media blog domain in comparison to other social media blog domains.

11. The computer-implemented method of claim 1, wherein the social media blog domain is a blog domain, and the social media page is a blog post.

12. The computer-implemented method of claim 1, further comprising:
   receiving the plurality of keywords through a user interface; and
   providing the plurality of keywords to a social media monitoring engine, wherein the data regarding the social media blog domain is received from the social media monitoring engine.

13. The computer-implemented method of claim 1, wherein the plurality of keywords defines at least one of a topic or a business context.

14. The computer-implemented method of claim 1, wherein the data regarding the social media blog domain is associated with a time period.

15. The computer-implemented method of claim 1, wherein normalizing the extracted values for the set of categories of metrics is performed based on the following formula:
   (Value−Min)*10/(MaxCutoff−Min),
wherein Value is an extracted value for a given category of metric for a given social media blog domain, Min is a minimum extracted value for the given category of metric based on a list of social media blog domains, and MaxCutoff is a value in the 98th percentile for the given category of metric based on the list of social media blog domains.

16. The computer-implemented method of claim 1, wherein the Structural Equation Modeling is performed using PROC CALIS in a Statistical Analysis System.

17. The computer-implemented method of claim 1, wherein the activity is based on a first metric relating to a count of weeks the plurality of social media pages is created in a given time frame, a second metric relating to a count of the plurality of social media pages, and a third metric relating to a count of days since a last social media page is created.

18. A computing system comprising:
   a communication interface to receive, from a social media blog domain, data relevant to a keyword with which to perform a search of the social media blog domain;
   a metric extractor to extract values from the data for a set of categories of metrics associated with the social media blog domain, wherein the set of categories of metrics comprises social engagement, activity, blog page influence, and blog domain influence;
   a normalizer to normalize the extracted values;
   a weight assignor to assign a weight to each category of metric using a statistical technique, wherein the weight indicates an importance of each category of metric and the statistical technique is based on Structural Equation Modeling; and
   a score determiner to calculate an influence score for the social media blog domain based on a weighted sum of the normalized extracted values using the weight assigned to each category of metric.

19. The system of claim 18, further comprising a database to store the weight assigned to each category of metric, and wherein the score determiner is to use the stored weight assigned to each category of metric to calculate the weighted sum of the normalized extracted values.

20. A non-transitory computer-readable medium comprising instructions that when executed cause a computing system to:
   receive data regarding a social media blog domain based on relevancy to a plurality of keywords, wherein the extract values from the data for a set of categories of metrics-associated with the social media blog domain, wherein the set of categories of metrics comprises social engagement, activity, blog page influence, and blog domain influence;
   normalize the extracted values for the set of categories of metrics;
   assign a weight to each category of metric using a statistical technique that indicates an importance of each category of metric and the statistical technique is based on Structural Equation Modeling; and
   calculate an influence score for the social media blog domain based on a weighted sum of the normalized extracted values using the weight assigned to each category of metric.

* * * * *